United States Patent [19]

Warsing et al.

[11] Patent Number: 5,842,652

[45] Date of Patent: Dec. 1, 1998

[54] WASTE RECYCLABLE PROCESSING MECHANISM

[76] Inventors: John Albert Warsing, 215 Race Track Rd., Edinburg, Va. 22824; Richard Berkeley Britton, Rte. 18, Box 16-B, Charlottesville, Va. 22911; Malcolm Philemon Woodward, P.O. Box 6701, Chv., Va. 22906-6701

[21] Appl. No.: 569,916

[22] Filed: Dec. 8, 1995

[51] Int. Cl.⁶ .................................................. B02C 21/02
[52] U.S. Cl. .................... 241/81; 241/135; 241/101.741; 241/101.76
[58] Field of Search .......................... 296/24.1; 414/508, 414/406–412; 241/101.76, 101.77, 101.74, 101.741, 101.75, 81, 135

[56] References Cited

U.S. PATENT DOCUMENTS

| | | |
|---|---|---|
| 2,961,977 | 11/1960 | Coleman ...................... 241/101.741 X |
| 4,854,406 | 8/1989 | Appleton et al. . |
| 5,074,737 | 12/1991 | Pellegrini et al. . |
| 5,078,567 | 1/1992 | Lombardo . |
| 5,116,184 | 5/1992 | Pellegrini . |
| 5,171,119 | 12/1992 | Carson . |
| 5,209,312 | 5/1993 | Jensen . |
| 5,222,853 | 6/1993 | Carson . |
| 5,277,536 | 1/1994 | Baldwin et al. . |
| 5,395,061 | 3/1995 | Merklinger .................... 241/101.741 X |

FOREIGN PATENT DOCUMENTS

| | | | |
|---|---|---|---|
| 0500004 | 8/1992 | European Pat. Off. | ........ 241/101.741 |
| 3542254 | 7/1987 | Germany | ................. 414/406 |
| 3939985 | 6/1991 | Germany | ................. 414/406 |

Primary Examiner—Mark Rosenbaum

[57] ABSTRACT

This waste recycling processing mechanism combines in a self powered unit in a preferred embodiment on a vehicle apparatus that sorts and processes recyclable materials. In another embodiment, this processing mechanism is constructed as a transportable unit that is self contained for road, rail or marine delivery to government, military, industrial, commercial and public sites. This unit may be set up for stationary operation with cruise ships, cargo vessels, and military ships as well as passenger trains and aircraft. This processing mechanism reduces the volume of recyclable waste by factors as high as 20 or more into the most compact forms in separated bins, and is capable of yielding uncontaminated, market-ready recyclable products by operator or by automatic means. Operator safety and comfort with resultant increased efficiency are paramount considerations provided in all units. The mobile units include an operator harness attachable to a safety track, hand bars, padded surfaces, ultraviolet shielding from sunlight, and a canopy to provide weather protection and the facility for heat and air conditioning.

21 Claims, 4 Drawing Sheets

WASTE RECYCLABLE PROCESSING MECHANISM

BACKGROUND OF THE INVENTION

The present invention generally relates to processing recyclable materials into the smallest, densest, most compact forms in separated bins to yield market ready, income producing recyclable products; and provide a flexible processing mechanism that can handle present and future materials of all varieties.

It is obvious that recycling of material from our daily and weekly refuse collecting will remain increasingly important now and in the future as our landfills become overloaded, restricted and reach maximum capacity for their sites. The amounts of recyclable material produced per capita per day in this country would seem to be approximately 4.25 pounds which represents for this country one billion pounds per day. The recovery of any significant percentage of this wasted material by recycling and processing into market ready materials would save our valued natural resources and energy. Technology and an increasing market facilitate and give incentive to recycle with steady and increasing prices being offered for recyclable material including plastics of at least 6 types and grades, clear glass and to limited extent-green glass, newsprint, cardboard items, metals including aluminum, lead and steel, and certain automotive products. In this processing mechanism these marketable recyclable materials would be clean and uncontaminated, dense and compact in form, packaged in bins or bales, and ready to sell which will turn a burden into a benefit.

Prior systems for collection of recyclables typically overload with bulk, deliver marginal and often useless contaminated material which is often just landfilled at a dump. They overload quickly and often in just one item giving limited and restricted service for recycling, and are limited in flexibility and adaptability in processing many items. These systems prove to be awkward and difficult to operate and to sort and most require elaborate, expensive and complex recycling centers. A study of the processing mechanism herein will show its adaptability and benefit in the small operations often remote or rural as well as fixed sites and smaller mobile operations in counties and towns most of which are now without satisfactory service.

Concern for the convenience and safety of the operator has been limited in the past especially concerning working and riding on the mobile units [Lombardo, U.S. Pat. No. 5,078,567, Jan. 7, 1992], acessability to the equipment, and a means to sort the incoming recyclables [Baldwin et al. U.S. Pat. No. 5,277,536, Jan, 11, 1994] With this processing mechanism improvements and concerns include a centralized optimum work height non-slip walkway, safety harness with track for use while in motion, safe seating and padded surfaces, noise protection in the machine operation, ultraviolet shielding from sunlight which is becoming increasingly necessary when outside, and hot weather with the use of a canopy cover overhead optionally with open sides, with windows, and with rollup canvas/plastic awning windows, and with the facility for heating and air conditioning.

Prior art regularly concerns vehicle collection, lifting, and loading from the curb, co-mingling versus separating of recyclables, accumulation, compacting in standard or specialized compartments, storage and transport of material to recycling centers for processing. There has been no emphasis or provision for reduction of volume prior to hauling recycled material from the curb to a central recycling facility. There has been no approach to creating an income producing material as seen here and little effort to create an increased recyclable product from the curbside The usual approach has been to collect uncompacted recyclables in bulk until full in one or more container bins and then haul to a recycling center or Multipurpose Receiving Facility to unload and return to the route which is wasteful of time, equipment and energy. This is often a procedure undertaken several times a day on each route, and often involves a considerable distance for each trip.

[Chart to follow on next page]

In our propriety census of pilot recycling program in 3 municipal areas these figures were compiled.

RECYCLABLE MATERIAL PER PERSON & PER HOUSEHOLD IN POUNDS PER WEEK IN PERCENTAGE ORDER OF PRODUCTS

| Material** | Person /Week /lbs. | Household /Week /lbs. | Percentage /lbs. /Week |
|---|---|---|---|
| Paper | 1.933 | 7.210 | 48.9 |
| Clear glass | 1.001 | 3.502 | 23.7 |
| Green glass | 0.287 | 1.006 | 6.8 |
| Brown glass | 0.268 | 0.940 | 6.4 |
| Ferrous | 0.433 | 0.900 | 6.1 |
| All plastic | 0.201 | 0.737 | 5.0 |
| Aluminum | 0.126 | 0.462 | 3.1 |
| TOTAL lbs. | 4.249 | 44.757 | 100.0 |

**Exclusive of trash & garbage, yard waste, construction and roofing, appliances, furniture, and automotive items such as used oil, tires, batteries, and antifreeze. Many of these items can be recycled conveniently.

In this invention's application we assume 5.2 Hrs. net to work of each shift of 8 Hrs. allowing for starting up equipment in the morning, lunch and break times, travel to and from a route, and evening clean up and shut down of equipment. In our proprietary studies we find that the assigned route of households to collect recyclables from is averaged at 1,246 on a route in urban and higher density neighborhoods which would allocate 15 seconds per collection point at this number. Our data shows that 53% of a route will actually place recyclables out each week when there is collection one day a week. Up to 90% of the households on these routes will participate in waste recycling in a 90 day period. With this urban and higher density neighborhoods such collections would average 28 seconds using this data which seems realistic. In the suburban neighborhoods and the more rural settings, the time between collections will increase again and collections would reduce by as much as 50% from the urban collections. The one great advantage evident with this processing mechanism is that the unit can stay out on its route all day even in the very high density routes thereby avoiding two or three return trips to a recycling center which most trucks do at present.

[Chart to follow on next page]

WEIGHT AND VOLUME PER HOUSEHOLD [PER WEEK]

| Households Pounds per week | Urban, Higher Density 1250 × 53% = 660 Wt./Vol. lbs/CuYds | Suburban, Medium Density 5.2 hrs @ 45 sec. = 416 Wt./Vol. lbs/CuYds | Rural, Low Density 660 × 50% = 330 Wt./Vol. lbs/CuYds |
|---|---|---|---|
| Paper 7.210 | 4,759/8.16 | 2,999/5.15 | 2,379/4.08 |
| Glass: | | | |
| Clear 3.502 | 2,311/1.20 | 1,457/0.76 | 1,155/0.60 |
| Green 1.006 | 664/0.34 | 418/0.22 | 332/0.17 |
| Brown 0.940 | 620/0.32 | 391/0.20 | 310/0.16 |
| Ferrous 0.900** | 594/0.70 | 374/0.44 | 297/0.35 |
| Plastic 0.737 | 486/10.06* | 307/6.34* | 243/5.03* |
| Aluminum 0.462** | 305/1.22 | 192/0.77 | 153/0.61 |
| TOTAL: | | | |
| Wt./lbs. | 9,739/ | 6,138/ | 4,870/ |
| Vol./CuYds. | 22.00 | 13.88 | 11.00 |
| VOLUME AFTER PROCESSING: | | | |
| in CuYds. | 11.26 | 8.16 | 5.65 |

*With proper on unit processing a reduction of up to 90% of the bulk is possible as plastic containers are mostly air.
**Metal cans can be reduced by processing on unit by at least 90% or more Prior art suggests many forms of bulk recyclable waste collection with the means of lifting and loading, transport and delivery to another processing center or storage site, but little art has been addressed to creating a final processed material on the unit on its route or at the unit on a fixed site. Economic considerations of costs and values of recyclables has not been addressed in the prior art, only the weighing of bulk delivery has been addressed. The weight of recyclable waste just as trash waste may increasingly become an issue for household or commercial collections as costs and fees increase. This invention addresses this issue of collectors and governments charging fees as recyclable waste is picked up with identification of each recycler or household such as with bar codes on the bulk container and with bar codes, microchips, implant codes to credit or charge for the individual recyclable materials for deposit return items and the more valuable items as credits and the unprofitable, uneconomic and often hazardous items as charges. An economic return is available even without the provisions of deposit return items for clean, uncontaminated processed material at the final markets as is evidenced by this chart provided at market prices for 1995.

[Chart to follow on next page]

VALUE OF HOUSEHOLD COLLECTION IN URBAN AREA

| Each household once per week Item | Pounds | Value | Urban, High Density = 660, Amount |
|---|---|---|---|
| Newsprint | 7.210 | $0.2884 | $190.34 |
| Cardboard* | [Not surveyed] | [$0.1515] | [$100.00] |
| Clear Glass | 3.502 | $0.08755 | $57.78 |
| Green Glass | 1.006 | $0.002515 | $1.67 |
| Brown Glass | 0.940 | $0.007050 | $4.65 |
| Ferrous Cans | 0.900 | $0.01350 | $8.91 |
| Plastic #1[35%] | 0.260 | $0.08268 | $54.56 |
| Plastic #2[45%] | 0.330 | $0.09949 | $62.63 |
| Aluminium | 0.462 | $0.28644 | $189.05 |
| TOTAL | 14.610** | $1.01 | $666.60 |

*Cardboard not in original survey, but has a strong market and values here are current.
**the 20% of other types of plastics would account for the 0.1470 lbs. in plastic collections.

A 1993 identifing system for plastics includes six basic resin types by codes and a seventh category which acts as a catch-all for other types. These are usually marked inside the recycling design triangle of three pointing arrows with the code number 1 to 7 shown. These codes are listed as follows: 1=PET which represents Polyethylene Terephthalate, 2=HDPE which stands for High Density Polyethylene, 3=PVC which stand for Polyvinyl Chloride, 4=LDPE which is Low Density Polyethylene, 5=PP which is Polypropylene, 6=PS which Polystyrene, and 7=other.

In the preceding chart the highest revenue is shown from apartments and dense urban neighborhoods with an obvious decrease in revenue from the suburban and rural collection areas. Of note here is that additional recyclables such as the 20% of other plastics which have an increasing market, and items such as automobile oil, antifreeze, batteries, and someday, tires, and the occasional metal from appliances which are all recoverable with this unit. In many areas and situations the deposit items may not be costed or credited to the household or party delivering the deposit return item and this revenue often can be gained from the operation of this unit. These items can add value to the revenue earned at no additional cost or burden, and such revenues can help greatly with the costs of collection services. Of course in many cases monthly service fees are allocated to recyclable collection along with trash service fees which again can increase revenues. Many situations are convenient to operate at longer hours than the net 5.2 hours estimated here, and this longer operation would collect more revenue. An added advantage in gaining revenue is that this unit can remain out on its route for much longer periods without filling up to capacity. Finally the operation of the fixed site units are often located at the most profitable site for producing valuable recyclables. These units require much less operating time and resultant labor cost, avoid the high cost of operating a vehicle and labor costs of a driver and the curbside pickup.

Another significant feature with this unit is that the final processed material is prepared market ready and not typically contaminated with the broken glass evident in the bulk collection units. The glass being handled several times as it is transferred from curbside to the Multipurpose Receiving Facility or recycling center frequently breaks and cross contaminates plastic, newsprint, cardboard, metals, and other glasses wherein the small pieces stick to or move along with other materials and will often cause problems in the recycling process. The result is a higher grade, acceptable, market ready product that increases recycling and lowers costs of overall recycling and represents great benefits in energy savings and ecological impact.

Benefits from this processing mechanism not seen in prior art includes not only the income from market ready recycling materials, but with the reduction in volume of materials on a route, many additional recyclables can be recovered and processed. On some routes a standard trash collection unit could be appended to this processing unit which can handle the entire route in one service operation and increase efficiency of collections.

For the fixed sites a storage area is provided to accumulate each separated material above the processor bin, or a larger bulk storage area to accumulate surplus recyclable material for convenience, until the automatic processing is supervised or an operator is available to process manually.

SUMMARY OF THE INVENTION

This Waste Recycling Processing Mechanism is constructed to meet current and future market needs and conditions. This is a product driven processing mechanism.

Accordingly, these are the steps available to this recycling process as performed with this mechanism:

1. Gather, collect and accumulate recyclable material;
2. Weigh, charge/credit, record items if relevant;
3. Sort, divide and deliver manually, and automatically when technology provides, to processor or storage;
4. Grind/granulate glass into bins according to color;
5. Crush/flatten metal cans into bin[s]; **
6. Sort plastic by type for processing:
   a. crush and flatten [#1&2, separate bins];
   b. optionally to bale;
   c. optionally shred and bale;
   d. melt and reduce styrofoam and light plastics;
   e. non-prime [#3–8+] compact and bale;
   f. non-usable, compact as trash.
7. Store in bulk paper and cardboard;
8. Store tires and batteries [when space is available];
9. Decant used motor oil and anti-freeze into separated safe tanks as provided on these units;
10. Chip/chop/shred yard waste and brush to be recycled as compost and wood chips;
11. Reject/store/process/trash miscellaneous items on as delivered individual basis.

** Metal cans can be separated ferrous from aluminum at processors/bins, magnetically or manually, or after delivery by a recycling center whichever means is most efficient and cost effective.

This invention adapts to mobile uses readily and flexibly as with vehicles in combination, with trucks, truck and trailer, and with trailers that serve for public, urban and household collections of recyclable waste. The mobile embodiment will contain a means to gather and deliver to its sorting area by manual means, by powered sidelifter, and in some units by articulated telescopic arm manually directed, the waste recyclable material to be processed. The sorting area will be situated at the optimum location for safety, convenience, operator efficiency and easy accessibility to the processing machines.

In the mobile embodiments this invention provides for operator safety even while in motion by means of an overhead track and safety harness with non-skid walkway that is elevated to an optimal working height. In the operator working area the corners and edges of the equipment and stations will be padded, and noise protection from machine operations will be provided. Safe seating with foldable, stowable features, and support stanchions and safe hand bars for use while in motion will be provided. A safe and convenient environment for the operator at the sorting station will allow faster sorting of the incoming co-mingled material, minimizes operator risk, movement, and fatigue, and allows the operator to select accurately uncontaminated material for each processor. All weather protection shall include ultraviolet shielding from sunlight and a roofing canopy to serve as open air or with provisions for roll-up canvas/plastic sides/awnings for temporary conditions, and optionally with fixed sides and windows/doorway which can include heat and air conditioning as needed.

The sorting area/tray is an area that can receive each incoming bin from a household and can accumulate material for the processors. In this area the equipment to weigh each collection bin and any selected items may be provided for necessary billings, credits, census taking and records and in combination with the machine vision to read each container and item selected for its code/source. In some cases the equipment and computer will remain on the unit, whereas in others, the computer or recorder would have a plug or connector and be brought onto the unit each working day. The machine vision can incorporate a laser scanner/reader or sensor for bar codes, readable identity, type of material code, implant chip, microprocessor, or automatic signal that can identify the household source and identify the co-mingled materials as to product, type and grade for processing.

The sorting area is for separating co-mingled materials at the onset of the process. The good, recoverable, recyclable items are separated from the hazardous waste, unusable and contaminated material, and the substandard items which can be returned to the curb immediately with a note as to why refused. At this receiving station/sorting area the trash items and bulkier items such as odd-sized, larger plastic containers, newspapers, cardboard, automotive, and household items that can be accepted on the unit will be, stored immediate to the area overhead and in spaces provided nearby. Acceptable used motor oil and anti-freeze solutions can be decanted into a holding rack to pour down a receiving spout into the several safe storage tanks provided with each unit which can be drained when filled at the recycling center.

At this sorting area the cans and soda bottles of normal size of all types can be dispensed manually as tossed/thrown into processor overhead catching/storing bins to accumulate until sufficient to process whereupon by manual or automatic means the processor will be activated. Means may be provided for automatic delivery to processors by gravity slides and fixed gravity tubes/trays, and optionally, by an air blower and tube direct or in combination with a small articulated conveyor delivery system that can tip items into a selected processor and similarly with air knives to separate items at selected processor. Means may be provided for automatic sorting as well and delivery to processors by these similar means.

The mobile embodiment and certain fixed site units would contain an independent electric power source or other power source in the independent operation of this mobile processing mechanism and this power source can be by attachments affixed direct to a truck engine, in combination and along vehicle chassis, or can be an independent engine source located elsewhere upon the vehicle, truck and trailer, to provide power[s] for the operation of the processing mechanism.

In the transportable, demountable embodiment the waste recyclable material is gathered, collected and accumulated in bulk and stored until an operator is available to process, or when sufficient recyclable material is at hand, or at times when convenient. This transportable, demountable unit is constructed on a frame to operate independently at its site with a plurality of unloadable bins as requisite to process all acceptable waste recyclable products. As in the other embodiments, the sorting and separating can be manual, or automatic by laser scanner and machine vision, to separate colors of glass, types and grades of plastics, metals, paper and cardboard, and other desired recyclables from waste, and then to process each into a separate bin. This process will deliver a compact, clean, and uncontaminated market-ready product that should earn the top dollar in the recycling markets. Material that is not clean, not suitable, of poor type and quality, and without market demand and function is trashed by the operator.

Many recyclables of desired quality and type may possess a bar code, readable identity, type of material code, implant chip with automatic signal, or microprocessor chip which can facilitate and speed processing of these co-mingled materials at origination of sorting procedures which can be by automatic means, by manual means, and by combinations of these means and which can include delivery to the processors by air blower and tube, small articulative conveyor that can tip items into a processor and with air knives and as practicable fixed gravity delivery tubes as the bulked items are introduced to the sorting area.

This transportable frame structure is the best embodiment to serve designated fixed sites for industrial plants, commercial and office uses, recycling centers, shopping centers, housing and apartment complexes, and to include military bases as well as naval and ocean vessels. This transportable unit would contain an independent electric power source and adapts/substitutes conveniently to fixed site electric power source when available.

In all configurations of this invention the processing mechanism equipment can be movable so as to operate over a plurality of bins, and can be removed conveniently as required by a standard forklift and replaced quickly with an empty bin. These bins are of several standard sizes and capacity, and of strength to contain the heavy weights of recyclables such as glass, and can be shipped directly to market when filled.

DESCRIPTION OF THE PREFERRED EMBODIMENTS

Figure 1:
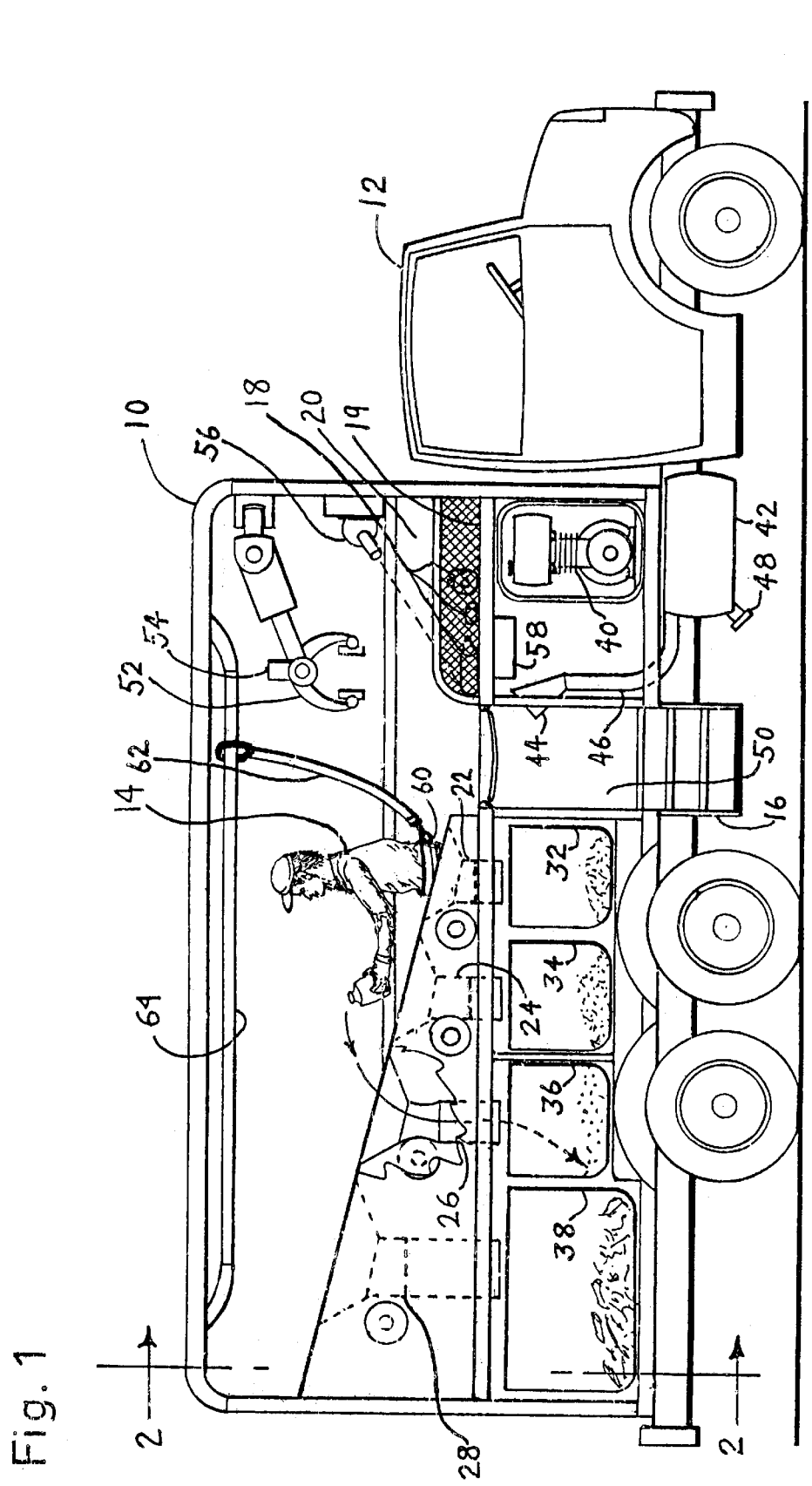
FIG. 1 is a side view of a truck mounted recycling mechanism, partially cutaway.
Figure 3:
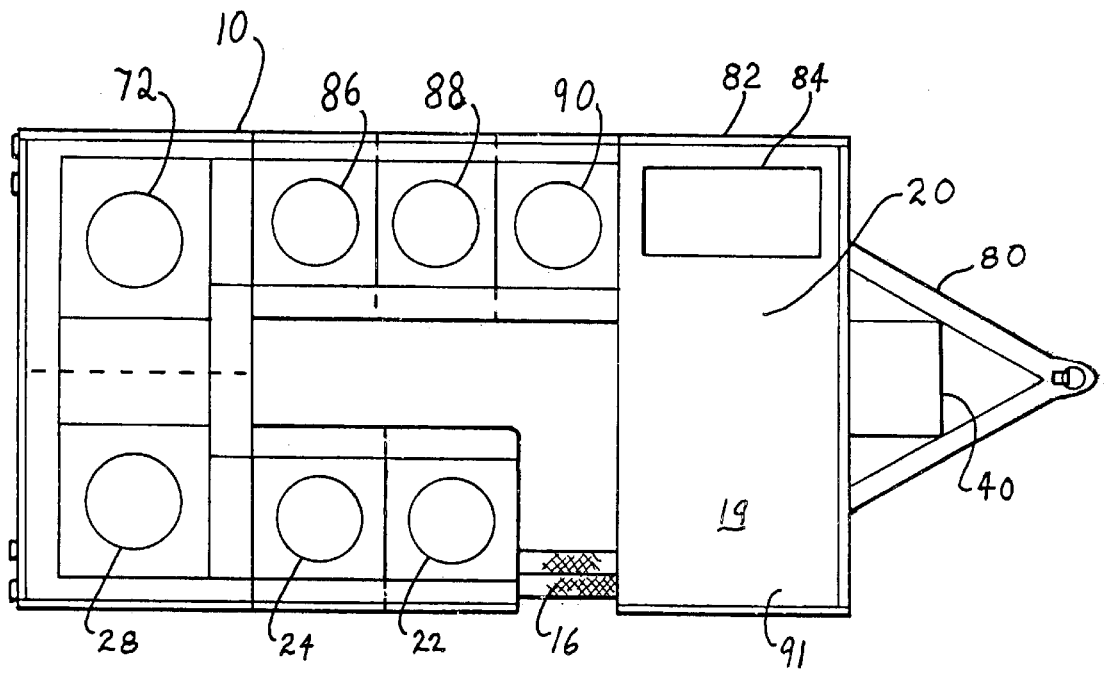
FIG. 3 is a sectional view from above of trailer mounted recycling mechanism illustrated in FIG. 4.

Turning now to the drawings, there is shown in FIG. 1 a waste recycling processing mechanist 10 which in this preferred embodiment is mounted on a truck vehicle 12 for the pickup and processing of recyclable waste materials from curbside. During operation, a worker 14 will collect containers of waste from curbside, using the stairs 16 for direct access, and deposits said waste 18 onto sorting tray 19 of sorting area 20. As the truck is driven to the next pickup, worker 14 sorts the waste and deposits compatible materials in one or another of a multiplicity of processors 22, 24, 26, and 28 which may typically and respectively be arranged for crushing clear glass 22, green glass 24, brown glass 26, and for flattening or shredding Type 1 plastics at 28. As shown in FIGS. 1 & 3, a central aisle 50 allows worker 14 to access processors along each side of the mechanism 10.

Bins 32, 34, 36, and 38 are set under each processor to receive the reduced recyclable materials. An independent power source 40 such as a gasoline engine or diesel engine driven AC alternator unit is mounted in the processing mechanism to provide power for the processors 22, 24, 26, and 28. Alternatively, power may be obtained from the engine of the truck vehicle 12 to simplify the fueling needs of the vehicle.

Provisions for collection of recyclable oils and antifreezes and other liquids as they may come into use is provided by tanks 42, and other tanks not shown, fitted with filling funnel 44 connected through pipe 46 to tank 42, which tank may be drained through valve 48 into larger containers for return of the liquids to a refinery.

To speed up loading of waste materials from curbside, a crane or automated crane 52 powered by the power source 40 may be used. This crane 52 may be fitted with automated weighing means 54 to provide the weight of each container picked up from curbside to be correlated with the identification of said household. This can be provided by means such as bar coding or an identification chip or an inductor/capacitor resonant circuitry attached to the container and registered by automated reader/scanner 56. The weight and household information so provided may then be sent to an onboard computer 58 for possible adjustments in the billing to each individual household.

Since the worker 14 will be continuing his work as truck 12 moves from pickup to pickup, provision has been made for his safety against falls by a safety harness 60 attached by a strap 62 to an overhead track 64 to allow freedom for movement from the sorting area 20 to the most rearward processor 28 in the mechanism.

Figure 2:
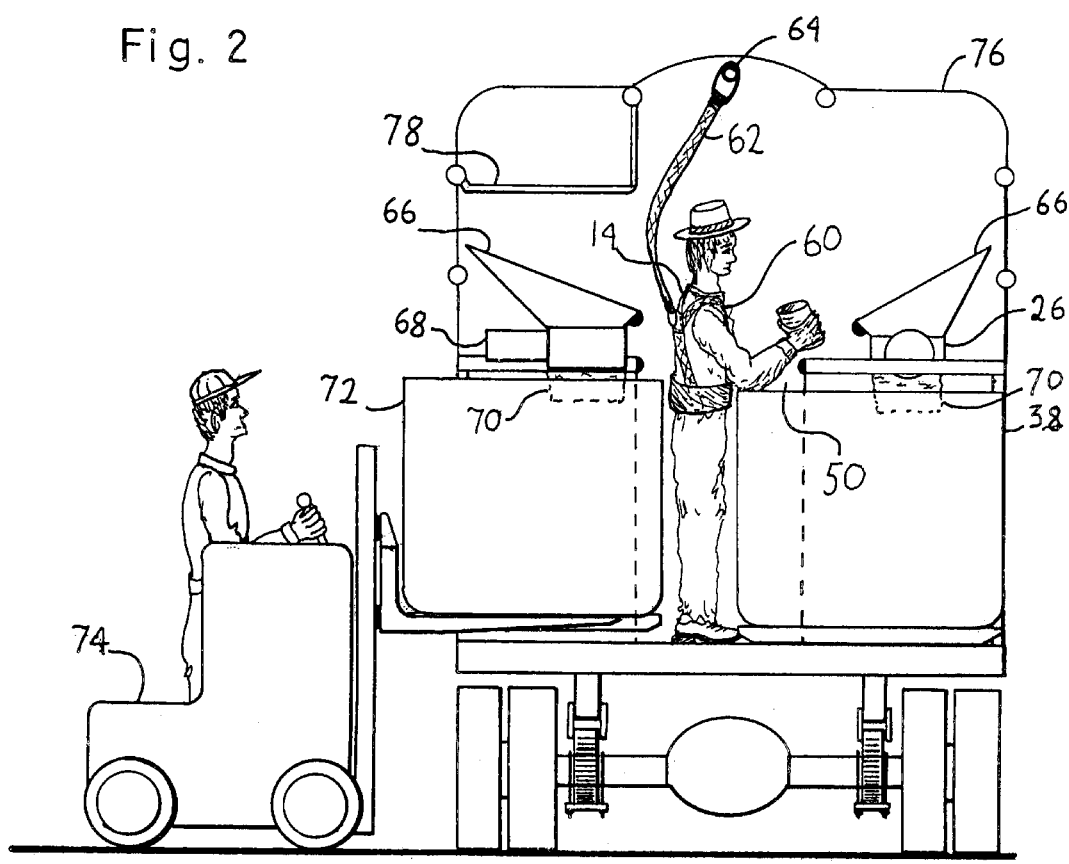
FIG. 2 is a sectional view from the rear of the truck mounted recycling mechanism of FIG. 1.

In FIG. 2, the worker 14 is shown in the aisle 50 and the arrangement of hoppers 66 for guiding materials into the various processors 26 and 68 is shown. Under the processors 22, 24, 26, 28, and 68 and others, flexible skirts 70 may be used to reduce dust and the possibility of chips flying out and entering the work area.

FIGS. 2 & 1 further illustrate the facility provided in this recycling mechanism for the use of a forklift truck 74 to unload bins 38, 72, 32, 34, 36 etc, of processed recyclable materials from the mechanism. A full bin of materials such as crushed glass easily weighs 1,000 pounds or more. FIG. 2 also shows the use of a roof or canopy 76 to protect the worker 14 from exposure to the elements. Excess space near the roof may be fitted with shelves 78 for storage of lighter weight, bulky materials such as tires, corrugated cardboard, and the like.

In FIG. 3, the recycling mechanism is fitted onto a trailer 80. The layout of FIG. 3 is somewhat simplified and much less expensive that the mounting on a truck as in FIG. 1.

Figure 4:
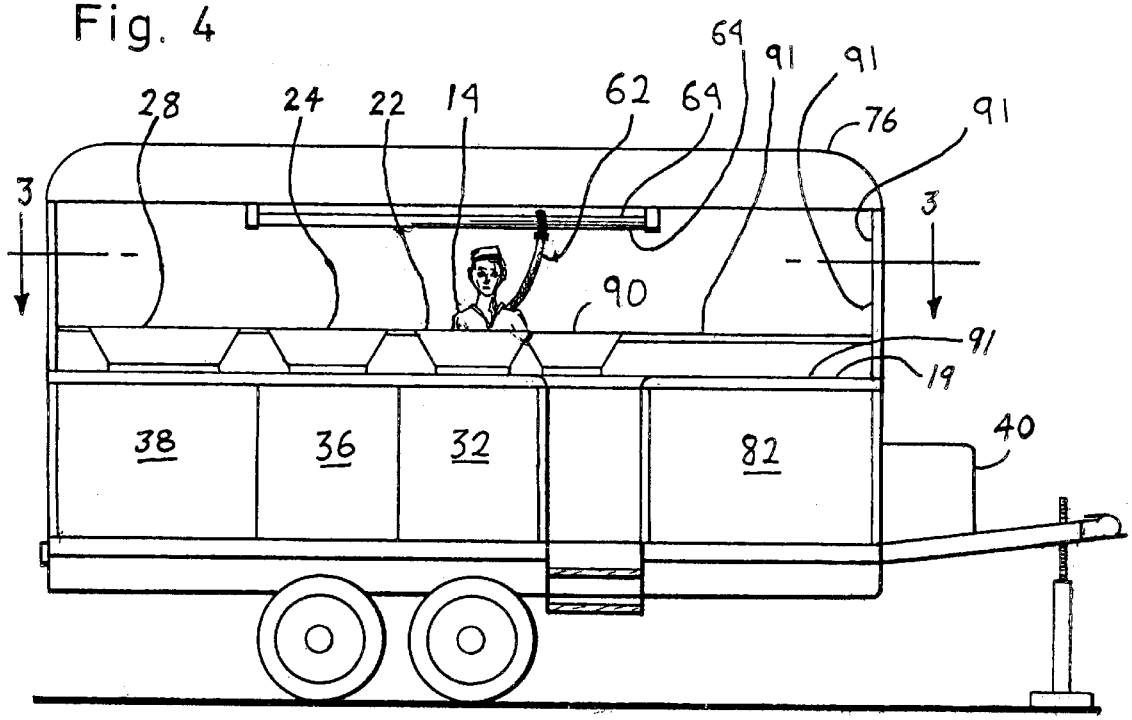
FIG. 4 is a side view of trailer mounted recycling mechanism.

FIG. 4 illustrates a setup of the trailerable recycling mechanism set up for use in a location such as the parking lot of a shopping center or at a central location in a town so that residents could bring in their recyclable waste materials. The unit could stay in place permanently and bins 38, 36, and 32 etc. can be removed to a truck by a forklift as they fill up, possibly daily or weekly. Since newspaper is about a third of the volume of urban recyclable material even after processing, bin 82 is provided here for newspaper and is accessible for processing through port 84 in the sorting tray 19. The canopy 76 provides weather protection to the worker 14 and to the processing machines 22, 24, 28, 72, 86, 88, and

90. Additional protection for the worker may be provided by the application of anti-flective material 91 to all surfaces as may be visible to the worker. Such anti-reflective surfaces might include a dull or dark paint, or similar coatings, or materials.

Figure 5:
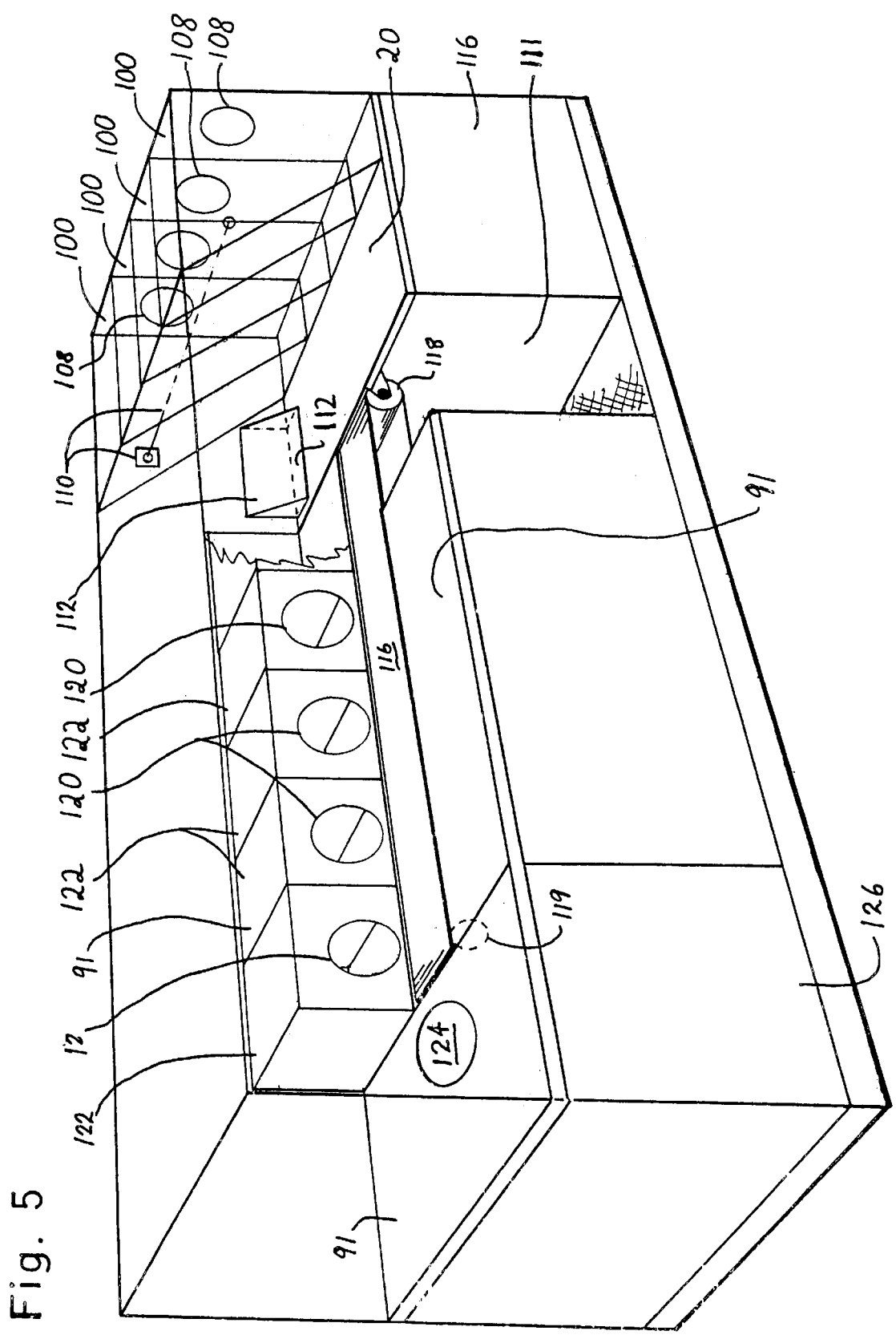
FIG. 5 shows pictoral view of a transportable recycling mechanism for stationary use, shown partially in skeleton detail and partially cutaway.

Turning now to FIG. 5, a more automated sorting system is illustrated in a portable version of the recycling mechanism designed for temporary setup at a fixed location such as on board a ship, at a factory, at a shopping center for use by the employees of the shops, at locations such as military bases and long term fixed sites.

The sorting area 20 in this unit is served by multiple feeders 100 which can temporarily store materials fed in by users through ports 108. By means of such storage in feeders 100, a worker is only needed when a feeder becomes full which may be detected by a photoelectric beam or other detection means which scans through the top of said feeders. The worker in this instance stands in vestibule 111 to perform sorting operations. Facility for newspapers is provided by port 112 that delivers through chute 114 into a bin 116 located under sorting area 20. A conveyer system consisting of belt 116 passing over rollers 118 and 119 serves to carry materials past ports 120 of material processors 122. Processors 122 may be set up on both sides of belt 116, each processor being set up over a bin appropriate for the material being collected. Air knives [not shown] or other means to direct recyclables into the appropriate processor according to machine vision reading [not shown here] of data imprinted on each item. All materials remaining on the belt at the end are ejected into port 124 over a catchall bin that can either be manually sorted at the main recycling facility or sent to the landfill.

While many details of the construction of our invention may be explained at further length, it is believed that the gist of the invention is fully described here and is well within the realm of understanding for utilization by anyone skilled in the art of waste management engineering.

We claim:

1. A waste recycling processing mechanism comprising, in combination:
    a frame structure mounted on a truck,
    a means for sorting at least four different types of recycables within said structure and accessible by a worker,
    at least four processors mounted within said structure for the reduction of the sorted different types of recyclables to smaller volume, and
    at least four bins arranged adjacent said processors for the receipt of reduced, sorted, different types of recyclables.

2. A mechanism as set forth in claim 1 further comprising automated identification means to aid the worker in sorting of said recyclable materials.

3. The mechanism of claim 1, further comprising:
    means for delivering recyclables from ground level to said sorting area,
    means for delivering the sorted recyclables from said means for sorting to said processors, and
    means for providing power to said processors.

4. A mechanism as set forth in claim 3 wherein said means providing for delivery of recyclables from ground level to said means for sorting is an automated pickup means.

5. A mechanism as set forth in claim 3 wherein said delivery means for the delivery of sorted waste from said means for sorting to said processors is an automated delivery system.

6. The mechanism of claim 1, wherein four of said at least four processors each reduce different types of recyclables and are selected from the group consisting of:
    a clear glass reduction processor;
    a brown glass reduction processor;
    a green glass reduction processor;
    a metals reduction processor;
    a plastics reduction processor;
    a paper product reduction processor;
    a yard waste reduction processor;
    a miscellaneous trash reduction processor;
    a metal can reducer;
    an aluminum can reducer;
    a plastics crusher and flattener;
    a plastics compactor and baler;
    a plastics shredder and baler;
    a melter for melting and reducing styrofoam and light plastics;
    a first type plastics reducer;
    a second type plastics reducer;
    an oil processor; and
    an antifreeze processor.

7. A waste recycling processing mechanism comprising, in combination:
    a transportable frame structure,
    a means for sorting waste within said structure,
    at least four bins supported by said structure,
    means for receiving waste at said means for sorting so as to segregate said waste into separate groups of different recyclable materials, and
    at least four waste recycling material processors supported by said structure so as to deposit segregated materials into said bins.

8. A mechanism as set forth in claim 7 wherein said transportable frame structure is suitable for mounting on an air, land, or water transport vehicle.

9. A mechanism as set forth in claim 7 wherein said transportable frame structure is suitable for mounting on a trailer.

10. A mechanism as set forth in claim 7 wherein said transportable frame structure is suitable for mounting on a truck.

11. A mechanism as set forth in claim 7 further comprising provision for a worker to divide waste materials at said means for sorting and a walkway to allow the worker movement between the means for sorting and the processors.

12. A mechanism as set forth in claim 11 further comprising a track adjacent said walkway to allow for the attachment of a safety harness and belt to be worn by said worker to prevent his falling from the walkway.

13. A mechanism as set forth in claim 11 further comprising a solar shield over said walkway to reduce the exposure of said worker to hazardous solar and ultraviolet radiation.

14. A mechanism as set forth in claim 13 further comprising the use of low reflection surfaces adjacent said walkway to reduce exposure of said operator to reflected solar radiation.

15. A mechanism as set forth in claim 7 wherein said bins are fixed in place and include means for emptying processed material contents.

16. A mechanism as set forth in claim 7 wherein said bins are removable for emptying.

17. A mechanism as set forth in claim 7 wherein at least one of said waste recycling material processors is movable so as to be operable over a multiplicity of bins.

18. The mechanism of claim 7, further comprising;
   means for delivering said separated groups of materials to the appropriate processors; and
   means for providing power to operate said processors.

19. A mechanism as set forth in claim 18 wherein said processors are electrically driven and said means for providing power comprises an electrical power generator mounted on said structure.

20. A mechanism as set forth in claim 18 wherein said processors are electrically driven and said means for providing power comprises an electrical connection to a conventional commercial electric source when an independent power source is not required.

21. The mechanism of claim 7, wherein four of said at least four processors each reduce different types of recyclables and are selected from the group consisting of;
   a clear glass reduction processor;
   a brown glass reduction processor;
   a green glass reduction processor;
   a metals reduction processor;
   a plastics reduction processor;
   a paper product reduction processor;
   a yard waste reduction processor;
   a miscellaneous trash reduction processor;
   a metal can reducer;
   an aluminum can reducer;
   a plastics crusher and flattener;
   a plastics compactor and baler;
   a plastics shredder and baler;
   a molter for melting and reducing styrofoam and light plastics;
   a first type plastics reducer;
   a second type plastics reducer;
   an oil processor; and
   an antifreeze processor.

\* \* \* \* \*